United States Patent

[11] 3,585,350

[72] Inventor James E. Voytko
 Gahanna, Ohio
[21] Appl. No. 777,026
[22] Filed Nov. 19, 1968
[45] Patented June 15, 1971
[73] Assignee Western Electric Company, Incorporated
 New York, N.Y.

[54] METHODS OF AND SYSTEMS FOR JOINING ARTICLES
 16 Claims, 5 Drawing Figs.

[52] U.S. Cl. .................................................... 219/121
[51] Int. Cl. .................................................... B23k 9/00
[50] Field of Search .......................................... 219/121
 EB, 7.5, 10.73, 9.5, 10.75, 158, 161; 331/94.5;
 29/493, 211 M; 335/285; 250/227

[56] References Cited
 UNITED STATES PATENTS

| | | | |
|---|---|---|---|
| 1,709,716 | 4/1929 | Fielder ........................ | 219/158 |
| 3,258,573 | 6/1966 | Morin ......................... | 219/9.5 |
| 3,313,906 | 4/1967 | Gerber ........................ | 219/7.5 |
| 3,448,280 | 6/1969 | Blitchington ................ | 250/227 |
| 3,463,898 | 8/1969 | Takaoka ...................... | 331/94.5 |
| 3,476,170 | 11/1969 | Christian .................... | 219/7.5 |

*Primary Examiner*—Milton O. Hirshfield
*Assistant Examiner*—R. Skudy
*Attorneys*—H. J. Winegar, R. P. Miller and Don P. Bush ABSTRACT: A pulsed, optically pumped laser device is utilized to develop a beam of radiant energy which is concentrated and focused onto areas of juxtaposed articles to be joined. Conventionally, the radiant energy heats the areas of the articles to be joined so that the areas may be joined together. A highly concentrated magnetic field is developed by a magnetic device in the areas to be joined.

The magnetic field induces a current in the articles placed in this field. The interaction between the high density field and the magnetic field produced by the induced current in the articles produces a force impulse on the articles and facilitates the application of a clamping force upon the articles during the period when the radiant energy of the laser is heating the areas of the articles to be joined. In cases where the articles are nonconductive, a conductive overlay may be utilized to provide the force transmission to the nonconductive articles beneath.

Since high currents are required for a flashing lamp of the laser device and for the magnetic device, the system for joining the articles includes a single current supply source which supplies the same current simultaneously to the flashing lamp and to the magnetic device for effecting the simultaneous heating and clamping of the areas of the articles to be joined.

INVENTOR
J. E. VOYTKO 3,585,350

METHODS OF AND SYSTEMS FOR JOINING ARTICLES

BACKGROUND OF THE INVENTION

1. Field of the Invention

This invention relates to methods of and systems for joining articles and relates particularly to the simultaneous heating and compressing of portions of articles to be joined to facilitate the joining of the articles together.

2. Description of the Prior Art

Conventionally, the joining of articles is accomplished by many manufacturing methods including various techniques of bonding and welding. One form of bonding to join articles is accomplished by heating portions of articles to be joined and placing the heated portions into engagement with each other to facilitate a joining of the heated portions of the articles. Due to the concentration of heated atmosphere within the area of the portions of the articles to be joined, it is difficult to apply any form of direct pressure onto the areas of the articles to be joined during the time when the articles are being heated.

If the structure of the articles to be joined is such that portions of the articles are outside of the areas which are subjected to the heated atmosphere, it is feasible that those portions outside of the heated atmosphere could be utilized to facilitate the application of an indirect from of pressure upon the areas of the articles to be joined. However, such indirect application is cumbersome and feasible only when the structure and dimensions of the articles facilitate such indirect pressure application.

If surfaces of the articles to be joined, which frequently include cavities and voids are not placed properly in intimate contact, then gases may be entrapped in the cavities and voids during the bonding process. These entrapped gases tend to weaken the strength of the bond and eventually may cause the bond to fracture.

It has been demonstrated that use of a laser can be effective in joining articles. A beam of radiant energy can be focused onto the areas of the articles to be joined to heat the areas where contiguous heated surfaces of the articles are joined.

By using the laser, the articles to be joined are heated so rapidly that the capacity of the material of the articles to dissipate the heat is exceeded and, therefore, a major portion of the heat energy can be utilized in the bonding process. Additionally, the use of the laser facilitates the desirable creation of an alloy when dissimilar metals are to be joined.

As disclosed in an article entitled "Laser Beams and Integrated Circuits" in the Bell Laboratories Record, Sept., 1967, pages 247 through 251, lasers are used for making connections to semiconductor and thin film integrated circuits wherein large amounts of heat are concentrated in well-defined areas without damaging adjacent areas.

Due to the relatively small size of the elements associated with integrated circuits, it would be difficult to hold together the elements of the circuit which are to be joined by laser welding.

In the past, bonding techniques have been utilized wherein portions of articles to be joined are heated by an induction heating device and then subjected to a clamping pressure from external forces. While this procedure reduces the deleterious effects of gas entrapment in cavities and provides a good bond between the articles to be joined, there is a time delay required to raise the temperature of the areas of the articles to be joined to a preselected level before the clamping pressure is applied. In addition, temperature level detecting means are required to detect when the preselected temperature level is attained. Additional facilities are then controlled to provide the application of the clamping pressure.

Since the application of laser is so rapid, presently disclosed facilities and techniques for clamping the articles to be joined would not provide a good bond.

SUMMARY OF THE INVENTION

It is, therefore, an object of the invention to provide new and improved methods of and systems for simultaneously heating and applying a compressive force to portions of articles to be joined so that the articles are joined.

Another object of the invention is the provision of new and improved methods of and systems for simultaneously heating and applying compressive forces onto articles to be joined without physically engaging any potions of the articles.

Still another object of the invention is the provision of new and improved methods of and systems for simultaneously directing instantaneous radian energy onto portions of articles to be joined to heat the portions and applying magnetically induced instantaneous pressure fields to the portions of the articles being heated so that the articles are joined together.

A further object of the invention is the provision of new and improved methods of and systems for simultaneously directing radiant energy onto portions of low-conductivity articles to be joined, to heat the portions and applying compressing forces onto the articles to be joined so that the articles are joined together.

A method of joining articles in accordance with certain principles of the invention may include the steps of heating instantaneously adjacent portions of the articles to be joined and applying simultaneously an instantaneous compressive force on the adjacent heated portions of the articles so that the heated and compressed portions of the articles are bonded together. The heating of the adjacent portions of the articles may be accomplished by a focused beam of radiant energy generated by any suitable device such as, for example, a pulsed, optically pumped laser device while the compressive forces may be generated by a high density magnetic field which induces currents within the articles to be joined. A magnetic field is produced by the induced currents and interacts with the high density magnetic field to generate the compressive force. The laser device and a magnetic device are controlled simultaneously by passing instantaneously the same current through the laser device and the magnetic device so that the articles to be joined are positively compressed during the short instantaneous period when the laser device is being pulsed to facilitate a good bond between the articles with a minimal number of cavities and gas entrapments.

A system for joining articles in accordance with the principles of the invention may include means for heating contiguous portions of the juxtaposed articles to be joined, means for applying compressive forces to the heated portions of the articles, and means for operating simultaneously the means for heating and the means for applying the compressing forces so that the heated areas of the articles to be joined are compressed during the period when the areas are being heated to minimize the undesirable effects of gases entrapped within cavities of the articles about the heated areas and to facilitate a good bond between the areas of the articles being joined.

BRIEF DESCRIPTION OF THE DRAWING

Other objects and advantages of the present invention will be apparent from the following detailed description when considered in conjunction with the accompanying drawings in which.

DETAILED DESCRIPTION

Figure 1:
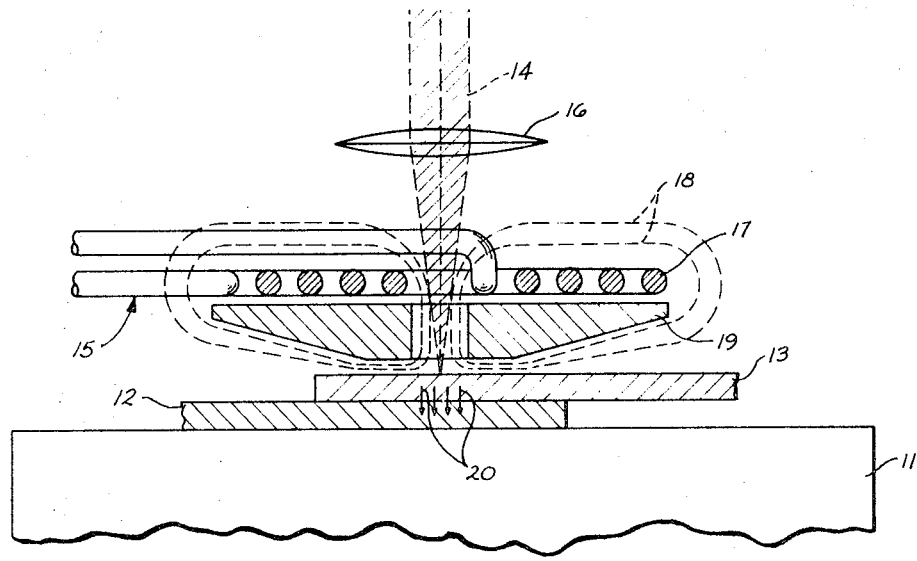
FIG. 1 is a partial sectional view showing the application of radiant energy and a magnetic field to articles to be joined in accordance with the principles of the invention.

Referring now to FIG. 1, there is shown a first embodiment of the invention including a stationary work table 11 for supporting thereon a pair of high-conductivity workpieces 12 and 13 composed of material such as copper or aluminum. Portions of the workpieces 12 and 13, having surfaces which are contiguous, are to be joined, for example, by bonding. A pulsed, optically pumped laser device (not shown) generates a beam 14 of radiant energy which is focused by a lens 16 onto portions of the contiguous surfaces of the workpieces 12 and 13 so that the portions of the contiguous surfaces are heated and melted substantially to facilitate the bonding together thereof.

Frequently, the workpieces 12 and 13 may be of such physical dimensions that it would be difficult to compress the contiguous surfaces of the workpieces other than by inherent gravitational forces. Additionally, due to the concentration of heat within a well-defined area, it may be difficult to locate conventional clamping facilities adjacent to the areas and the workpieces 12 and 13 to be clamped, for example, in the making of connections on integrated circuits.

To effect a clamping of the workpieces 12 and 13 without requiring physical contact with the workpieces, a magnetic device, designated generally by the numeral 15, includes a pancake force coil 17 which is positioned above the workpiece 13 and which is located axially with respect to the beam 14 of radiant energy developed by the laser device. When electrical energy is supplied to the pancake force coil 17, a high density magnetic flux, represented by the dotted lines 18–18, is developed and is concentrated by a metallic flux concentrator 19 of the magnetic device 15 to induce currents within the highly conductive workpieces 12 and 13. A magnetic field produced by the induced currents interacts with the high density magnetic flux of the force coil 17 thereby creating a pressure which compresses, but does not deform, the workpieces 12 and 13 toward the work table 11 as indicated by arrows 20.

The heating and compressing together simultaneously the contiguous surfaces of the workpieces 12 and 13 facilitates a more positive flow of molten material of the workpieces into cavities and voids of the contiguous, heated surfaces of the workpieces to minimize the number of gas entrapments in the final bond and effects a good bond between the heated portions of the contiguous surfaces of the workpieces.

Figure 2:
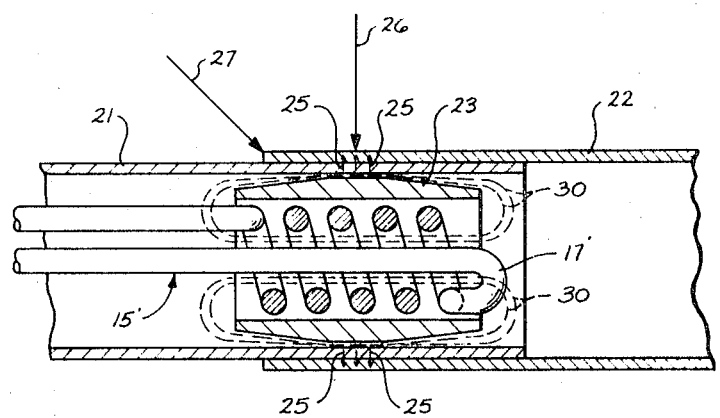
FIG. 2 is a partial sectional view showing an arrangement of a magnetic device and tubular articles to be joined in accordance with the principles of the invention.

Referring now to FIG. 2, there is shown another embodiment of the invention for joining a tubular workpiece 21 with a tubular workpiece 22. The tubular workpieces 21 and 22 are each composed of a high-conductivity material. One end of the tubular workpiece 21 is inserted into one end of the tubular workpiece 22 so that contiguous portions of the workpieces 21 and 22 may be bonded. In the embodiment of the invention which is illustrated in FIG. 2, a magnetic device, designated generally by the numeral 15', includes a generally cylindrically shaped, flux concentrator 23 which is positioned within the tubular workpiece 21 adjacent to the contiguous portions of the tubular workpieces 21 and 22. A helical force coil 17' of the magnetic device 15' is positioned within the cylindrically shaped, flux concentrator 23 for generating a high density magnetic field, represented by the dotted lines 30–30, which is concentrated in the areas of the contiguous portions of the tubular workpieces 21 and 22.

One or more beams of radiant energy, represented by arrows 26 and 27, may be directed onto the contiguous portions of the tubular workpieces 21 and 22 without concern for the angular incidence of the beams. The beams 26 and 27 of radiant energy facilitate the heating of the contiguous portions of the tubular workpieces 21 and 22 to effect the bonding thereof while the concentrated, high density magnetic field generated by the force coil 17' facilitates the development of clamping forces, in the direction of arrows 25, which aid in the bonding of the contiguous portions of the highly conductive, tubular workpieces.

Figure 3:
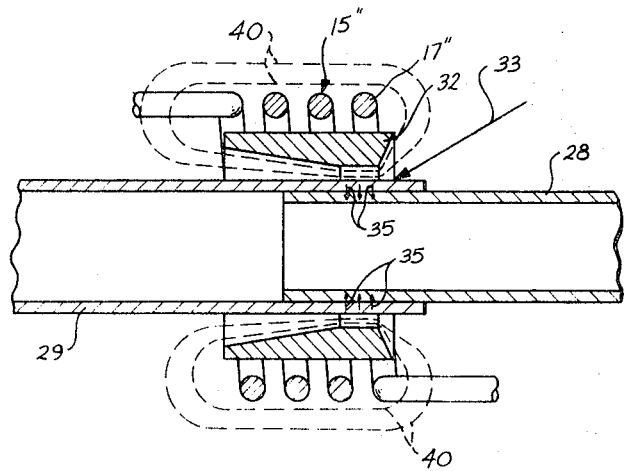
FIG. 3 is a partial sectional view showing an arrangement of magnetic device and a pair of tubular articles to be joined in accordance with the principles of the invention.

Referring now to FIG. 3, there is shown still another embodiment of the invention for joining a tubular workpiece 28 with a tubular workpiece 29. The tubular workpieces 28 and 29 are each composed of a high-conductivity material. One end of the tubular workpiece 28 is inserted into one end of the tubular workpiece 29 so that contiguous portions of the workpieces may be bonded. In the embodiment of the invention which is illustrated in FIG. 3, a magnetic device, designated generally by the numeral 15'', includes a helical force coil 17'' which is positioned about the contiguous portions of the tubular workpieces 28 and 29. A high density magnetic field, represented by the dotted lines 40–40, is developed by the force coil 17'' and is concentrated by a generally cylindrically shaped, flux concentrator 32 of the magnetic device 15'' for concentrating the high density magnetic field with the contiguous portions of the tubular workpieces 28 and 29. A beam of radian energy, represented by the arrow 33, may be directed onto the contiguous portions of the tubular workpieces 28 and 29 to facilitate the bonding of the workpieces during a period when the clamping forces, which are indicated by arrows 35 and generated by the magnetic field, are also being directed toward the contiguous portions of the highly conductive tubular workpieces to effect a good bond between the workpieces.

Figure 4:
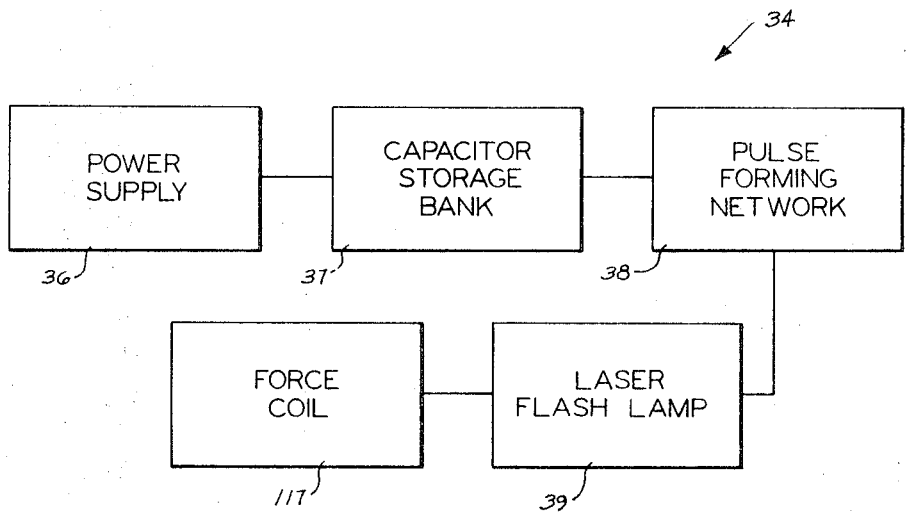
FIG. 4 is a block diagram showing the general arrangement of current supply means for laser and magnetic devices in accordance with the principles of the invention.

Referring now to FIG. 4, there is shown a block diagram of an electrical system, designated generally by the numeral 34, for facilitating the simultaneous pulsing of the laser device and the generating of the magnetic field to develop the clamping pressure which may be utilized in each of the three embodiments shown in FIGS. 1, 2 and 3. The system 34 includes a power supply 36 which is utilized to charge a capacitor storage bank 37. Periodically the potential stored in the capacitor storage bank 37 is coupled to a pulse forming network 38 for developing a high current pulse which is passed instantaneously through a flash lamp 39 of the laser device and simultaneously instantaneously through a force coil 117. It is noted that the flash lamp 39 represents the flash lamp of each of the laser devices and the force coil 117 represents each of the force coils 17, 17' and 17'' in each of the embodiments shown in FIGS. 1, 2 and 3.

Since the laser technique is a rapid instantaneous process, it is desirable to apply the compressive force to the workpieces to be joined, for example, the workpieces 12 and 13 (FIG. 1), during the instant when the workpieces are being heated by the beam 14 of radiant energy developed by the laser device. Hence, the simultaneous and instantaneous application of the developed current pulse from the pulse forming network 38 to the flash lamp 39 of the laser device and the force coil 17 of the magnetic device 15 facilitated the simultaneous application of the necessary instantaneous heating and compressive forces to effect the good bond.

Figure 5:
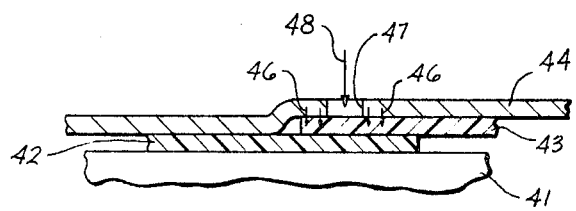
FIG. 5 is a partial sectional view showing two low-conductivity articles to be joined with a high-conductivity overlay.

Referring to FIG. 5, there is shown a stationary worktable 41 for supporting a pair of workpieces 42 and 43 composed of a low-conductivity material and having contiguous portions which are to be joined. Since the workpieces 42 and 43 are composed of a low-conductivity material, any currents which may be induced in the workpieces by an external magnetic field will be insufficient to develop a clamping force required to effect a good bond in accordance with the principles of the invention.

An overlay 44 composed of a high-conductivity material may be positioned over the contiguous portions of the low-conductivity workpieces 42 and 43 so that when the overlay is subjected to a high density magnetic field, such as the field developed by the pancake force coil 17 (FIG. 1), currents are induced in the overlay. The high density field and a field developed by the currents induced in the overlay 44 create a force upon the overlay in the direction of arrows 46–46 which places a compressive force upon the contiguous portions of the workpieces 42 and 43. The overlay 44 is formed with an opening 47 to permit a beam of radiant energy, represented by an arrow 48, to be directed instantaneously into an area which includes the contiguous portions of the workpieces 42 and 43 so that the workpieces are heated. The simultaneous instantaneous application of heat and compressive force to the workpieces 42 and 43 results in a good bond between the low-conductivity workpieces.

What I claim is:

1. A method of joining contiguous surfaces of juxtaposed segments which comprises the steps of:
applying at least one beam of radiant energy instantaneously on at least one portion of at least one of the juxtaposed segments to be joined,
applying instantaneously a pressure onto at least some of the contiguous portions of the juxtaposed segments from a source spaced from the segments, and
causing simultaneous occurrence of the instantaneous application of the beam of radiant energy to the portion of the segment and the instantaneous application of the pressure to the contiguous portions of the juxtaposed segments so that at least some of the contiguous portions of the juxtaposed segments are heated and pressed together simultaneously and instantaneously to join the segments.

2. The method as set forth in claim 1 wherein the pressure is a magnetic pressure.

3. A method of joining contiguous surfaces of juxtaposed segments, which comprises the steps of:
positioning a radiant energy device spacially from and directed toward at least one portion of at least one of the juxtaposed segments to be joined,
positioning a pressure applying device spaced from and directed toward the at least portion of the at least one of the juxtaposed segments to be joined,
generating a single pulse of current from a single current source, and
passing the single pulse of current directly from the single current source through the radiant energy device and the pressure applying device simultaneously so that radiant energy is directed to and forces are applied to at least one portion of the at least one of the juxtaposed segments and at least some contiguous portions of the juxtaposed segments are heated and pressed together simultaneously to join the segments.

4. The method as set forth in claim 3 wherein the radiant energy device is a laser.

5. The method as set forth in claim 3 wherein the pressure applying device is a magnetic pressure device.

6. A method of joining contiguous surfaces of juxtaposed segments, which comprises the steps of:
positioning a radiant energy device spacially from and directed toward at least one portion of at least one of the juxtaposed segments to be joined,
positioning a pressure applying device spaced from and directed toward the at least portion of the at least one of the juxtaposed segments to be joined,
the radiant energy device and the pressure applying device being connected in series, and
passing a single pulse of current through the radiant energy device and the pressure applying device simultaneously so that radiant energy is directed to and forces are applied to the at least one portion of the at least one of the juxtaposed segments and at least some contiguous portions of the juxtaposed segments are heated and pressed together simultaneously to join the segments.

7. The method as set forth in claim 6 wherein the radiant energy device is a laser.

8. The method as set forth in claim 6 wherein the pressure applying device is a magnetic pressure device.

9. A system for joining contiguous surfaces of juxtaposed segments comprises:
means spaced from segments to be joined for applying at least one beam of radiant energy instantaneously on at least one portion of the juxtaposed segments which are to be joined,
means spaced from the segments for applying a compressive force instantaneously onto at least some of the contiguous portions of the juxtaposed segments,
means for controlling the means for applying the radiant energy and the means for applying the compressive force to cause simultaneous occurrence of the instantaneous application of the beam of radiant energy to the portion of the segment and the instantaneous application of the pressure to the contiguous portions of the juxtaposed segments so that at least some of the contiguous portions of the juxtaposed segments are heated and pressed together simultaneously and instantaneously to join the segments.

10. A system for joining contiguous surfaces of juxtaposed segments, which comprises:
a radiant energy device,
means for positioning the radiant energy device spacially from and directed toward at least one portion of at least one of the juxtaposed segments to be joined,
a pressure applying device,
means for positioning the pressure applying device spacially from and directed toward the at least portion of the at least one of the juxtaposed segments to be joined, and
means for passing a singly generated pulse of current directly from a single current source through the radiant energy device and the pressure applying device simultaneously so that radiant energy is directed to and forces are applied to the at least one portion of the at least one of the juxtaposed segments and at least some contiguous portions of the juxtaposed segments are heated and pressed together simultaneously to join the segments.

11. The system as set forth in claim 10 wherein the radiant energy device is a laser.

12. The system as set forth in claim 10 wherein the pressure applying device is a magnetic pressure device.

13. A system for joining contiguous surfaces of juxtaposed segments, which comprises:
a radiant energy device,
means for positioning the radiant energy device spacially from and directed toward at least one portion of at least one of the juxtaposed segments to be joined,
a pressure applying device,
means for positioning a pressure applying device spacially from and directed toward the at least portion of the at least one of the juxtaposed segments to be joined,
the radiant energy device and the pressure applying device being connected in series, and
means for passing a single pulse of current through the radiant energy device and the pressure applying device simultaneously so that radiant energy is directed to and forces are applied to the at least one portion of the at least one of the juxtaposed segments and at least some contiguous portions of the juxtaposed segments are heated and pressed together simultaneously to join the segments.

14. The system as set forth in claim 13 wherein the radiant energy device is a laser.

15. The system as set forth in claim 13 wherein the pressure applying device is a magnetic pressure device.

16. A system for joining contiguous surfaces of segments, which comprises:
a laser for directing a concentrated beam of radiant energy onto at least one portion of at least one of the juxtaposed segments to be joined so that the segments are heated,
an element spaced from and for producing a magnetic field in the area of the at least one portion of the at least one of the juxtaposed segments and for inducing a current in the segments so that a compressive magnetic force is developed to urge at least contiguous portions of the juxtaposed segments together, and
means for applying simultaneously and instantaneously a single pulse of current to the laser and the element so that radiant energy is directed to and forces are applied simultaneously and instantaneously to the at least one portion of the at least one of the juxtaposed segments and at least some contiguous portions of the juxtaposed segments are heated and compressed simultaneously to join the segments.